United States Patent
Yanase et al.

(10) Patent No.: US 6,857,454 B2
(45) Date of Patent: Feb. 22, 2005

(54) EVAPORATED-FUEL STORAGE SYSTEM

(75) Inventors: Taiki Yanase, Saitama (JP); Tsuyoshi Chou, Saitama (JP); Hisayuki Goma, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/407,147

(22) Filed: Apr. 4, 2003

(65) Prior Publication Data

US 2003/0213527 A1 Nov. 20, 2003

(30) Foreign Application Priority Data

Apr. 10, 2002 (JP) ........................................ 2002-107530

(51) Int. Cl.$^7$ ............................ B65B 1/04; F16K 24/00
(52) U.S. Cl. ........................ 141/303; 141/59; 141/198; 141/302; 141/308; 141/309; 137/589
(58) Field of Search ........................... 141/59, 192, 198, 141/285, 301–303, 308, 309; 137/587–592

(56) References Cited

U.S. PATENT DOCUMENTS 5,606,954 A    3/1997    Yamazaki et al.
5,630,445 A  * 5/1997    Horiuchi et al. ............ 137/592
6,062,276 A  * 5/2000    Benjey et al. ............... 141/198
6,533,002 B1 * 3/2003    Kobayashi et al. ......... 141/302
2001/0054452 A1  12/2001  Ozaki

FOREIGN PATENT DOCUMENTS

JP        07-180627      7/1995
JP        08-021317      1/1996
JP       2002-002314     1/2002

* cited by examiner

Primary Examiner—Timothy L. Maust
(74) Attorney, Agent, or Firm—Carrier, Blackman & Associates, P.C.; Joseph P. Carrier; William D. Blackman

(57) ABSTRACT

A fuel tank and a canister are connected to each other by a first evaporated-fuel passage and a second evaporated-fuel passage, and a valve chamber of a float valve separate from the fuel tank is disposed at an intermediate portion of the first evaporated-fuel passage. Thus, there is no limitation in the positional relationship between a filled-up liquid surface in the fuel tank and a valve seat of the float valve. Therefore, it is possible to reduce the vertical dimension of the float valve. Moreover, since the valve chamber is provided separately from the fuel tank, it is unnecessary to define an opening for mounting the valve chamber to the fuel tank.

3 Claims, 2 Drawing Sheets

EVAPORATED-FUEL STORAGE SYSTEM

BACKGROUND OF THE INVENTION

1. Field of the Invention

The present invention relates to an evaporated-fuel storage system in which a canister adapted to adsorb an evaporated fuel is connected to a fuel tank.

2. Description of the Related Art

Such evaporated-fuel storage systems are known from Japanese Patent Nos. 2808403 and 3158170, their corresponding U.S. Pat. No. 5,606,954, and Japanese Patent Application Laid-open No. 2002-2314 and its corresponding U.S. patent Publication No. US-2001-0054452-A1. In an automobile having such a conventional evaporated-fuel storage system, an upper space in a fuel tank is connected to a canister through an evaporated-fuel passage, and an opening connecting the evaporated-fuel passage to the fuel tank is opened and closed by a float valve. If a liquid surface in the fuel tank is raised by supplying a fuel from a filler tube through a fuel supply nozzle, an evaporated fuel forced out of the fuel tank into the evaporated-fuel passage is adsorbed by the canister, thereby suppressing dissipation of the evaporated fuel to the atmosphere. If the liquid surface in the fuel tank becomes a filled-up liquid surface, a float of the float valve is raised and seated in the opening, whereby the evaporated-fuel passage is closed to suppress the rising of the liquid surface in the fuel tank. Therefore, the liquid surface in the filler tube rises to operate an automatic stopping device for the fuel supply nozzle.

However, the conventional system suffers from the following problem: If a distance between an upper wall of the fuel tank in which a valve chamber is mounted and a filled-up liquid surface is large depending on the shape of the fuel tank, a distance between a valve seat formed at an upper end of the valve chamber and the float vertically movably accommodated in the valve chamber is large, resulting in an increase in the size of the entire float valve. In recent years, there is a synthetic resin fuel tank formed by blow-molding a special laminating material impermeable to fuel. However, if a valve chamber of a float valve made of a different material is fitted into and welded to an opening defined in a fuel tank, the valve chamber of the float valve permits a small amount of fuel permeation. Therefore, even if the fuel tank itself is made of a material impermeable to the fuel, there is a possibility that the fuel permeates through the valve chamber.

SUMMARY OF THE INVENTION

Accordingly, it is an object of the present invention to reduce the size of a float valve, and to minimize the size of an opening for mounting the float valve to a fuel tank made of a synthetic resin impermeable to fuel, to suppress fuel permeation.

To achieve the above object, according to a first feature of the present invention, there is provided an evaporated-fuel storage system comprising: a fuel tank having a filler tube extending upwards; a canister for adsorbing an evaporated fuel fed from the fuel tank; a first evaporated-fuel passage connecting the fuel tank to the canister; a second evaporated-fuel passage connecting the fuel tank to the canister or an intermediate portion of the first evaporated-fuel passage; a float valve adapted to close the first evaporated-fuel passage when a liquid surface in the fuel tank becomes a filled-up liquid surface; and a cut valve adapted to close the second evaporated-fuel passage when the liquid surface in the fuel tank becomes a predetermined liquid surface higher than the filled-up liquid surface. In this system, a valve chamber of the float valve is disposed separately from the fuel tank above the fuel tank, and an upstream end of the first evaporated-fuel passage leading to the valve chamber opens at a location corresponding to the filled-up liquid surface in the fuel tank.

With this arrangement, the valve chamber of the float valve is disposed separately from the fuel tank above the fuel tank, thereby eliminating limitation in the positional relationship between the filled-up liquid surface in the fuel tank and a valve seat of the float valve. Therefore, it is possible to reduce the vertical dimension of the float valve. Moreover, the size of the opening for mounting the valve chamber to the fuel tank can be minimized, thereby suppressing the permeation of the fuel through the opening in the fuel tank made of a synthetic resin impermeable to the fuel.

According to a second feature of the present invention, in addition to the first feature, the valve chamber of the float valve is provided adjacent to a fuel supply port in the filler tube, and the valve chamber and the fuel supply port are connected to each other by an evaporated-fuel return passage.

With this arrangement, the valve chamber of the float valve is provided adjacent to a fuel supply port in the filler tube. Therefore, the length of the evaporated-fuel return passage connecting the valve chamber and the fuel supply port can be shortened, leading to reductions in the size and weight of the evaporated-fuel return passage and a reduction in amount of permeating fuel.

According to a third feature of the present invention, in addition to the first or second feature, a check valve adapted to be opened upon application of a predetermined pressure to the fuel tank is disposed in the second evaporated-fuel passage and mounted integrally with the valve chamber of the float valve.

With this arrangement, the check valve adapted to be opened upon application of the predetermined pressure to the fuel tank is disposed in the second evaporated-fuel passage. Therefore, even if the fuel is supplied little by little through a fuel supply nozzle into the fuel tank after the fuel tank has entered a filled-up state where the float valve closes the first evaporated-fuel passage, the liquid surface in the filler tube can be raised until the pressure in the fuel tank exceeds a pressure for opening the check value. Thus, an automatic stopping device for the fuel supply nozzle can be reliably operated to prevent the fuel from flowing through the second evaporated-fuel passage into the canister. If the internal pressure in the fuel tank in the filled-up state rises due to a rise in temperature or the like, the check valve is opened when the internal pressure exceeds the pressure for opening the check valve, whereby the evaporated fuel can be discharged through the second evaporated-fuel passage into the canister. Further, since the check valve is mounted integrally with the valve chamber of the float valve, reductions in the size and weight of these valves can be achieved, as compared with a case where the check valve is mounted separately from the valve chamber of the float valve.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
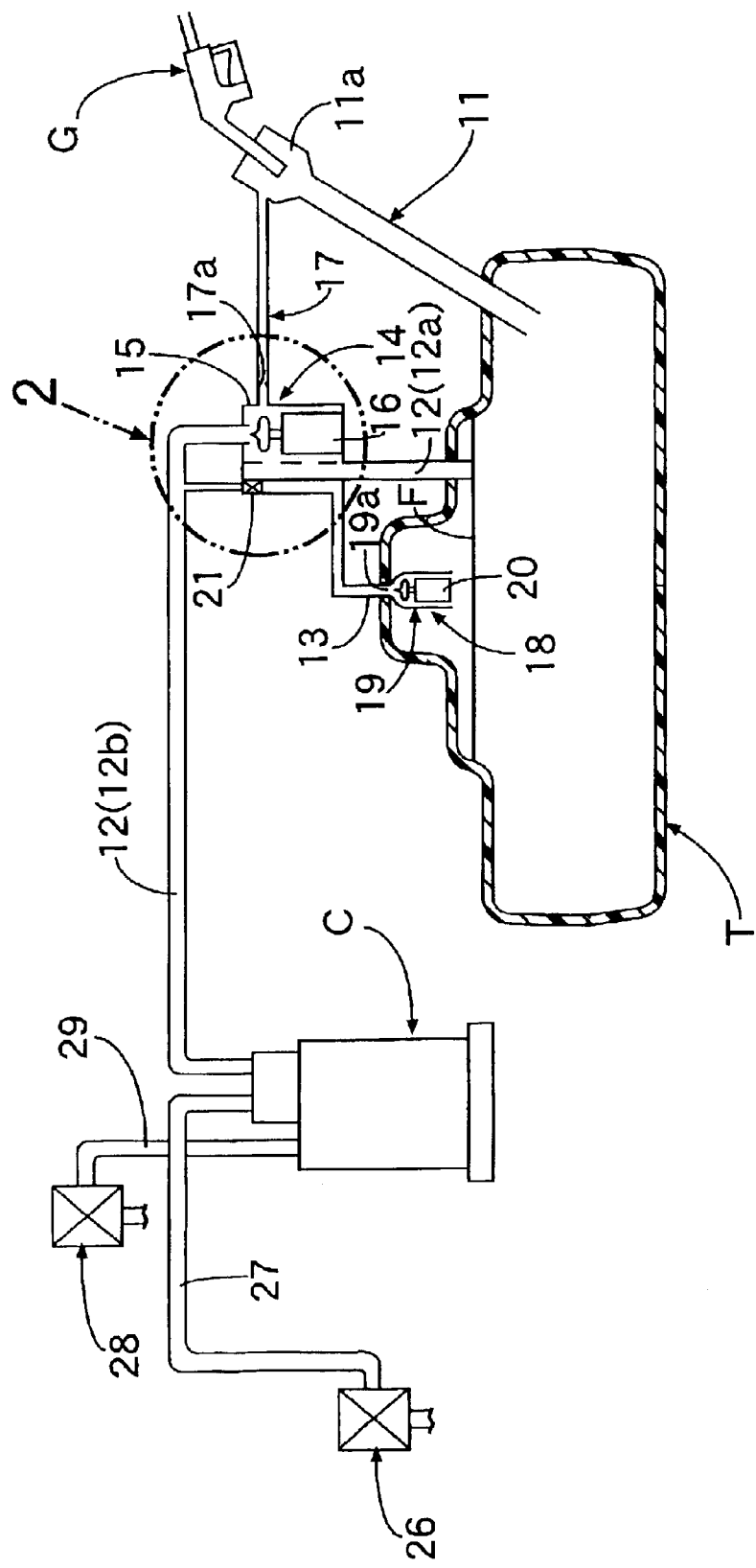
FIG. 1 is a view showing the entire arrangement of an evaporated-fuel storage system according to an embodiment of the present invention.
Figure 2:
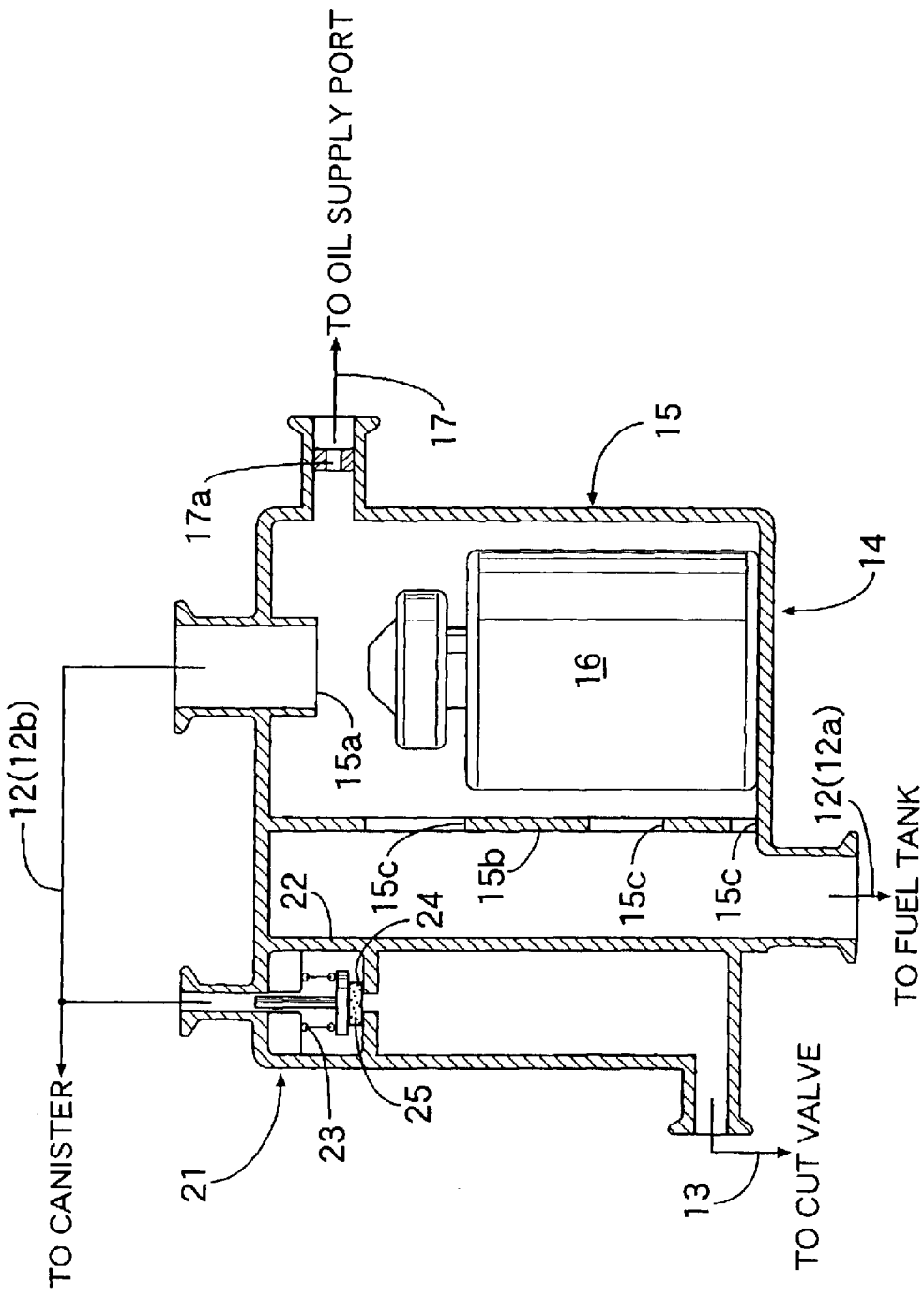
FIG. 2 is an enlarged view of a portion indicated by 2 in FIG. 1.

Referring first to FIGS. 1 and 2, a fuel tank T is formed by blow-molding a synthetic resin impermeable to fuel, and includes a filler tuber 11 extending upwards and having a fuel supply port 11a defined at its upper end. An upper space in the fuel tank T and a canister C for adsorbing an evaporated fuel generated in the fuel tank T to suppress the dissipation to the atmosphere, are connected to each other through a first evaporated-fuel passage 12. The first evaporated-fuel passage 12 includes an upstream portion 12a leading to the fuel tank T and a downstream portion 12b leading to the canister C. The upstream portion 12a extends through an upper wall of the fuel tank T, and opens at a level corresponding to a filled-up fuel surface. The upper space in the fuel tank T is connected to the downstream portion 12b of the first evaporated-fuel passage 12 through a second evaporated-fuel passage 13.

A float valve 14 is disposed between the upstream portion 12a and the downstream portion 12b of the first evaporated-fuel passage 12, and includes a vessel-shaped valve chamber 15. The downstream portion 12b is connected to a valve seat 15a formed at an upper portion of the valve chamber 15. The upstream portion 12a is connected to a valve seat 15a through a through-bore 15c made in a sidewall 15b of the valve chamber 15. A float 16 is vertically movably accommodated in the valve chamber 15. When the float is floated up by the fuel flowing into the valve chamber 15, an upper end of the float 16 abuts against the valve seat 15a to close the first evaporated-fuel passage 12. The valve chamber 15 and a portion of the filler tube 11 in the vicinity of the fuel supply port 11a, are connected to each other by an evaporated-fuel return passage 17 having a constriction 17a.

A cut valve 18 is mounted at a location higher than the filled-up fuel surface F, i.e., at a portion of the second evaporated-fuel passage 13 connected to the fuel tank T, and includes a float 20 vertically movably accommodated in a valve chamber 19. When the fuel tank T is largely inclined, the float 20 is seated on the valve seat 19a, thereby preventing the fuel in the tank T from flowing into the canister C through the second evaporated-fuel passage 13.

A check valve 21 is mounted at an upper end of the second evaporated-fuel passage 13 extending upwards from the cut valve 18, and includes a valve chamber 22 integral with the valve chamber 15 of the float valve 14 and a valve member 25 biased by a resilient force of a spring 23 in the valve chamber 22 in a direction of seating on a valve seat 24. As a result, the check valve 21 is opened when the pressure in the fuel tank T rises to exceed the pressure in the canister C by a predetermined pressure (e.g., 0.8 kPa corresponding to a fuel column of about 150 mm).

A purge passage 27 communicating with an intake system of an engine through a purge valve 26 and a vent passage 29 communicating with the atmosphere through a vent valve 28, are connected to the canister C.

Thus, when the fuel is supplied from the filler tube 11 through a fuel supply nozzle G, the liquid surface in the fuel tank T gradually rises. The evaporated fuel forced out of the fuel tank T into the upstream portion 12a of the first evaporated-fuel passage 12, is supplied from the valve seat 15a of the opened float valve 14 via the downstream portion 12b of the first evaporated-fuel passage 12 to the canister C, so that the evaporated fuel is adsorbed by the canister C, thereby preventing the dissipation of the evaporated fuel to the atmosphere. When the liquid surface in the fuel tank T becomes the filled-up fuel surface F, the space in the fuel tank T above the filled-up fuel surface F is brought into a sealed state, because the check valve 21 closes the second evaporated-fuel passage 13 in the closed state. Therefore, the fuel in the upstream portion 12a of the first evaporated-fuel passage 12 is raised to flow into the valve chamber 15 of the float valve 14. As a result, the float 16 in the valve chamber 15 is raised and seated on the valve seat 15a, whereby the evaporated fuel in the fuel tank T is not supplied to the canister C. Therefore, the liquid surface in the filler tube 11 rises so that a nozzle of the fuel supply nozzle G is submerged in the fuel, whereby an automatic stopping device is operated to automatically stop the supplying of the fuel.

In addition, a portion of the evaporated fuel forced out of the fuel tank T due to the supply of the fuel from the fuel supply nozzle G, is supplied to the fuel supply port 11a in the filler tube 11 via the evaporated-fuel return passage 17 having the constriction 17a, without being supplied to the canister C. This evaporated fuel is dragged and returned to the fuel tank T by the fuel supplied from the fuel supply nozzle G to the filler tube 11, thereby suppressing the drawing of fresh air from the fuel supply port 11a via the filler tube 11 into the fuel tank T. As a result, it is difficult for the fresh air to be drawn into the fuel tank T, so that it is difficult for additional evaporated fuel to be generated. Therefore, the load on the canister C can be alleviated, and the size of the canister C can be reduced.

When the liquid surface in the filler tube 11 rises, a portion of the fuel in the valve chamber 15 of the float valve 14 intends to return to the filler tube 11 through the evaporated-fuel return passage 17 having the constriction 17a, but the amount of the returned fuel portion is very small, so that the rise of the liquid surface in the filler tube 11 cannot be impeded.

Even when the fuel is supplied little by little from the fuel supply nozzle G after the fuel tank T has entered a filled-up state to close the float valve 14, the check valve 21 is not opened unless the internal pressure in the fuel tank T exceeds a pressure for opening the check valve 21. Therefore, the liquid surface in the filler tube 11 can rise to reliably operate the automatic stopping device for the fuel supply nozzle G, thereby reliably avoiding a situation that an excessive amount of the fuel supplied flows into the canister C through the second evaporated-fuel passage 13. Even if the internal pressure in the fuel tank T rises due to a rise in temperature in the filled-up state with the float valve 14 closed, the check valve 21 is opened if this internal pressure exceeds the valve-opening pressure. Therefore, it is possible to prevent damage of the fuel tank T due to a rise in pressure caused by supply of the evaporated fuel to the canister C.

As described above, the valve chamber 15 of the float valve 14 is provided separately from the fuel tank T, and hence it is unnecessary to define an opening for mounting the valve chamber 15 to the fuel tank T. As a result, it is suffice to define, in the fuel tank, an opening having a small diameter to pass the upstream portion 12a of the first evaporated-fuel passage 12, so that the area of the opening defined in the fuel tank T formed of the synthetic resin impermeable to the evaporated fuel can be suppressed to the minimum to decrease the amount of permeating fuel.

In a conventional system in which a valve chamber 15 of the float valve 14 is provided integrally with a fuel tank T, the vertical dimension of a float 16 is limited by a distance between the position of a valve seat 15a at an upper end of the valve chamber 15 and a filled-up liquid surface F, and hence it is difficult to reduce the size of the float valve 14. In contrast, in the present embodiment, there is no limitation in the positional relationship between the filled-up liquid surface F in the fuel tank T and the valve seat 15*a* of the float valve 14, because the valve chamber 15*a* of the float valve 14 is provided separately from the fuel tank T. Therefore, it is possible to reduce the vertical dimension of the float valve 14.

In addition, since the float valve 14 is mounted above the fuel tank T, the evaporated-fuel return passage 17 connecting the valve chamber 15 of the float valve 14 to the fuel supply port 11*a* of the filler tube 11 can be shortened, leading to a reduction in the size and weight of the evaporated-fuel return passage 17 and a decrease in the amount of permeating fuel. Moreover, since the check valve 21 is mounted integrally with the valve chamber 15 of the float valve 14, reductions in the size and weight of these valves can be achieved, as compared with a case where the check valve 21 is mounted separately from the valve chamber 15 of the float valve 14.

Although the embodiments of the present invention have been described in detail, it will be understood that various modifications in design may be made without departing from the subject matter of the invention.

For example, the second evaporated-fuel passage 13 is connected to the intermediate portion of the first evaporated-fuel passage 12 in the embodiment, but may be connected directly to the canister C. In addition, the fuel tank T is not limited to that made of the synthetic resin, and may be formed of a metal.

What is claimed is:

1. An evaporated-fuel storage system comprising:

a fuel tank having a filler tube extending upwards;

a canister for adsorbing an evaporated fuel fed from the fuel tank;

a first evaporated-fuel passage connecting the fuel tank to the canister;

a second evaporated-fuel passage connecting the fuel tank to the canister or an intermediate portion of the first evaporated-fuel passage;

a float valve adapted to close the first evaporated-fuel passage when a liquid surface in the fuel tank becomes a filled-up liquid surface; and a cut valve adapted to close the second evaporated-fuel passage when the liquid surface in the fuel tank becomes a predetermined liquid surface higher than the filled-up liquid surface, wherein a valve chamber of the float valve is disposed separately from the fuel tank above the fuel tank, and an upstream end of the first evaporated-fuel passage leading to the valve chamber opens at a location corresponding to the filled-up liquid surface in the fuel tank.

2. An evaporated-fuel storage system according to claim 1, wherein the valve chamber of the float valve is provided adjacent to a fuel supply port in the filler tube, and the valve chamber and the fuel supply port are connected to each other by an evaporated-fuel return passage.

3. An evaporated-fuel storage system according to claim 1 or 2, further including a check valve disposed in the second evaporated-fuel passage and mounted integrally with the valve chamber of the float valve, the check valve being adapted to be opened upon application of a predetermined pressure to the fuel tank.

* * * * *